(No Model.)
R. A. CARTER.
TEMPLE WIRE BLANK.
No. 260,659. Patented July 4, 1882.
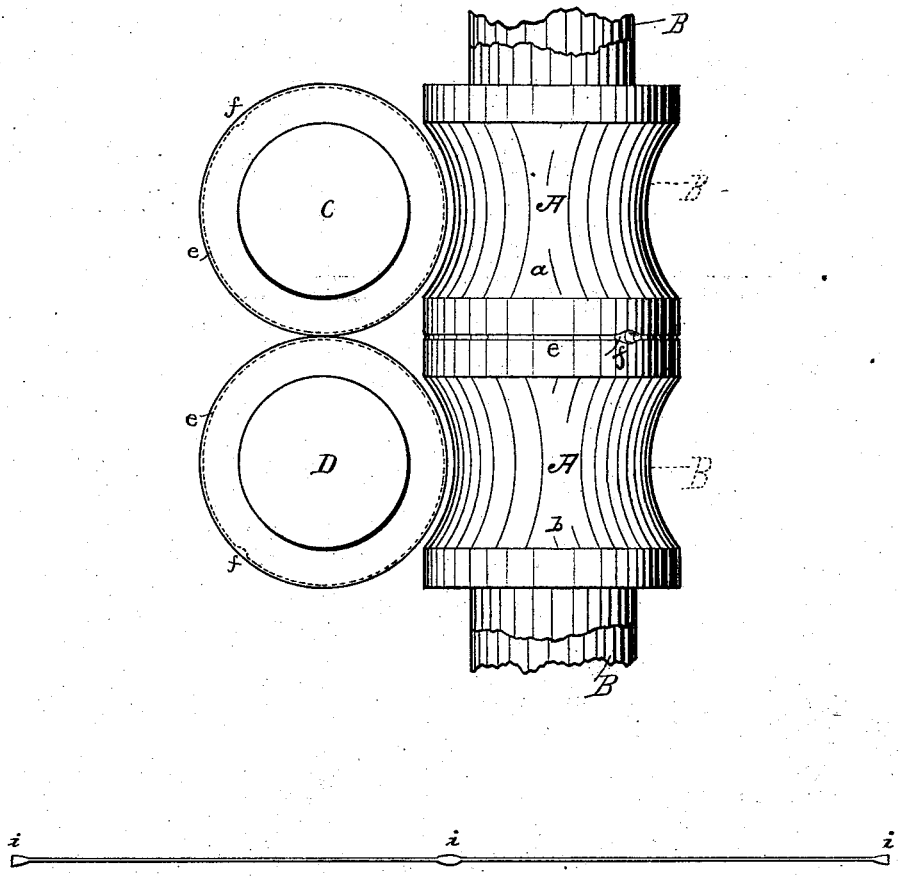
Witnesses:
Chas. O. Gill
Herman Guston
Inventor:
Robert A. Carter
By his Atty's
Cox and Cox

UNITED STATES PATENT OFFICE.

ROBERT A. CARTER, OF NEW YORK, N. Y., ASSIGNOR TO THE WARWICK MANUFACTURING COMPANY, OF NEWARK, NEW JERSEY.

TEMPLE-WIRE BLANK.

SPECIFICATION forming part of Letters Patent No. 260,659, dated July 4, 1882.

Application filed October 14, 1881. (No model.)

*To all whom it may concern:*

Be it known that I, ROBERT A. CARTER, of New York, in the county of New York and State of New York, have invented a new and useful Improvement in Spectacles, of which the following is a specification, reference being had to the accompanying drawing.

The invention relates to an improvement in the manufacture of spectacles; and it consists in a novel process for constructing in a single piece that part of a spectacle known as the "temple" or "ear" wire, and in the article produced.

The distinctive novelty of the invention consists in treating a rod of wire to reduce it in size for a length sufficient to constitute the temple and form at the end a bulb, which, being subsequently divided in two parts, is manipulated into the hinge of one temple and the terminal bulb of another.

The details of the invention will fully appear hereinafter, reference being had to the accompanying drawing, in which I will illustrate the machine for carrying my process into effect.

A B indicate a pair of rolls journaled in close relation to and parallel with each other. On each side of their center the rolls A B have corresponding concave surfaces, *a b*, in which the projecting parts of another pair of rolls, C D, are placed, the rolls last named being the same in all essential respects as the rolls A B, and arranged at right angles to their line of center.

At the center of each of the rollers A B C D is formed the annular groove *e*, having at proper points the enlargements *f*, which correspond in form and position in all of the rolls. The grooves *e* are about semicircular in form, so that when two of the rolls are placed together in parallel lines—such as the rolls A B and C D—the grooves will come opposite to each other and form a circular channel having corresponding enlargements at definite points.

The object of the concave surfaces on the rollers is to get the channel between one pair as close to the channel between the other pair as possible, so that as the wire passes from the rolls A B it may enter and pass through the channel between the rolls C D without any liability of being stretched and without loss of space. The rolls A B C D may be mounted in any suitable frame, and motion will be communicated to them in any convenient manner.

The wire to be treated will be of a diameter about equal to that of the enlargements *f*, and somewhat greater than that of the other parts of the channel. In forming the temple the rod of wire thus selected is fed into the channel between the rollers A B, where it is reduced in size and rolled smooth, except at the points where the wire comes in contact with the enlargements *f*, and at these points it takes the form of the enlargement, which is in the contour of an elongated bulb. Thus it will be seen that the condition of the wire after being treated by the rolls A B is that of a plain rod of wire having at certain definite points enlargements or bulbs *i*. The channel in the rolls A B leaves, however, a small fin on each side of the wire, and this is removed by the passage of the material through the channel formed in the pair of rolls C D. After the rod of wire has passed between both pairs of rolls the enlargements *i* are cut across transversely, and by means of a punch and die, or otherwise, one part is formed into the hinge and the other into the terminal bulb of a temple.

What I claim as my invention, and desire to secure by Letters Patent, is—

A blank for forming the temples of spectacles, consisting of a piece of wire having bulbs rolled at intervals, substantially as and for the purpose set forth.

In testimony that I claim the foregoing improvement in spectacles, as above described, I have hereunto set my hand this 11th day of October, 1881.

ROBERT ALEXANDER CARTER.

Witnesses:
HERMAN GUSTOW,
CHAS. C. GILL.